Nov. 16, 1948.    S. G. ISSERSTEDT    2,453,917
ELECTRIC MOTOR CONTROL APPARATUS
Filed March 26, 1943    3 Sheets-Sheet 1
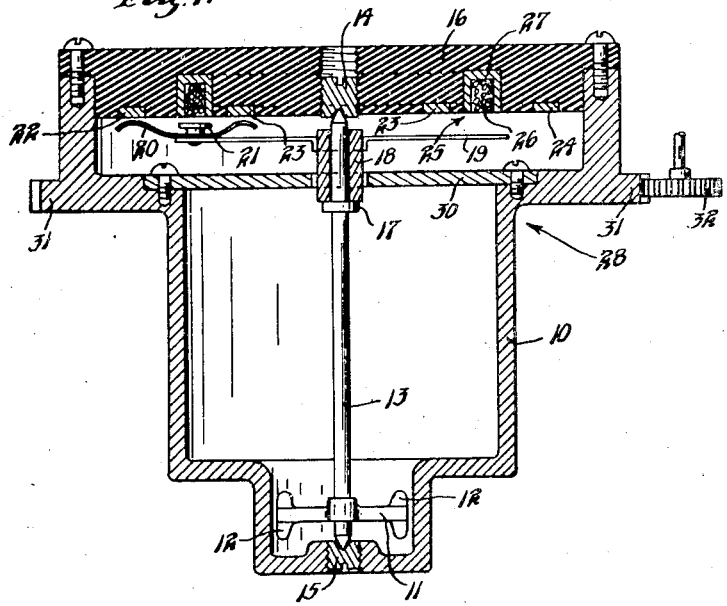
Inventor
SIEGFRIED G. ISSERSTEDT
By
George H. Fisher
Attorney Nov. 16, 1948.   S. G. ISSERSTEDT   2,453,917
ELECTRIC MOTOR CONTROL APPARATUS
Filed March 26, 1943   3 Sheets-Sheet 2
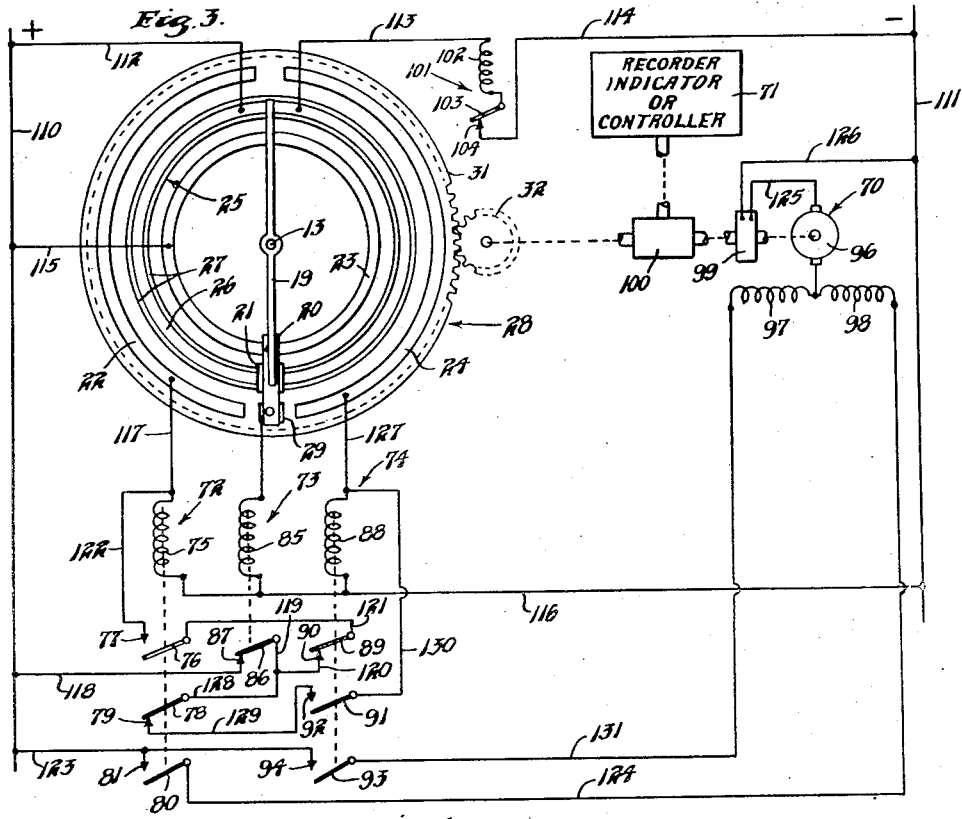
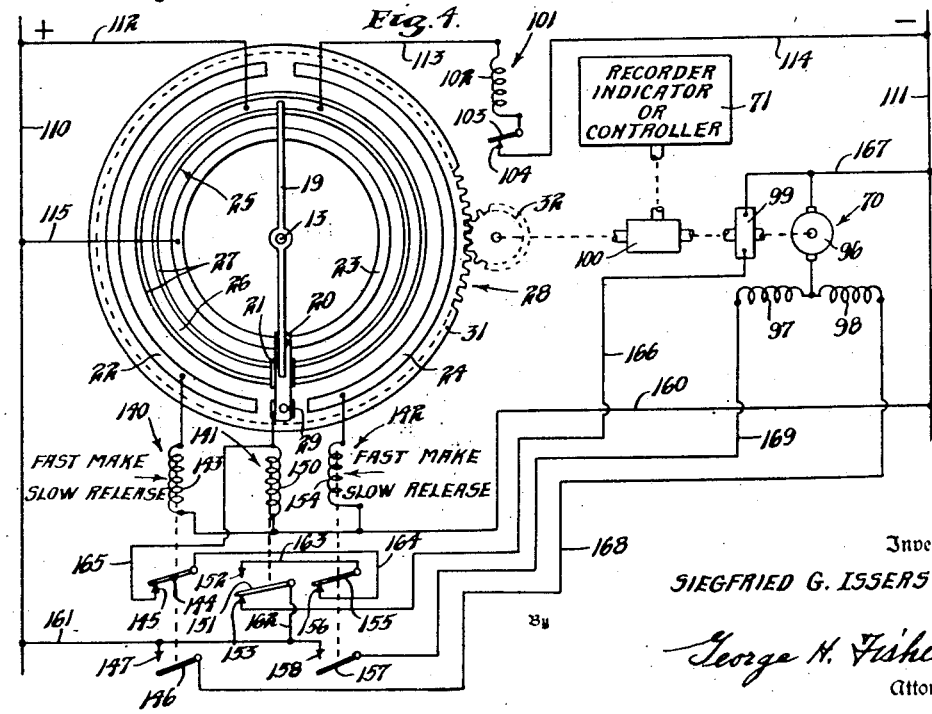
Inventor
SIEGFRIED G. ISSERSTEDT
George H. Fisher
Attorney Nov. 16, 1948.  S. G. ISSERSTEDT  2,453,917
ELECTRIC MOTOR CONTROL APPARATUS
Filed March 26, 1943  3 Sheets-Sheet 3
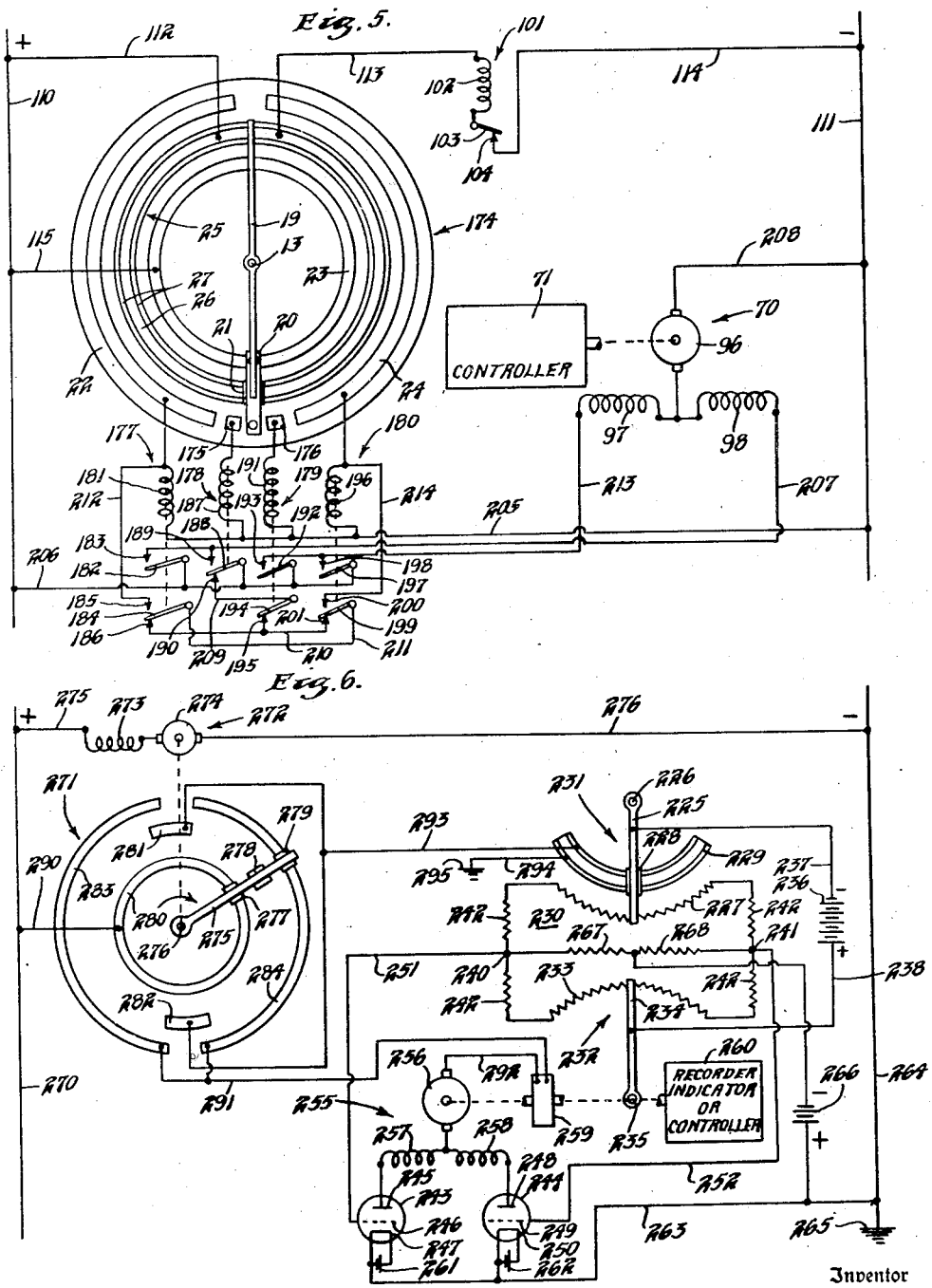
Inventor
SIEGFRIED G. ISSERSTEDT
By George H. Fisher
Attorney Patented Nov. 16, 1948

2,453,917

UNITED STATES PATENT OFFICE 2,453,917

ELECTRIC MOTOR CONTROL APPARATUS

Siegfried G. Isserstedt, Toronto, Ontario, Canada, assignor to Minneapolis-Honeywell Regulator Company, Minneapolis, Minn., a corporation of Delaware Application March 26, 1943, Serial No. 480,672

16 Claims. (Cl. 318—28)

1

The present invention relates to control apparatus, and particularly to a controlling, indicating, or recording system wherein a reversible motor is controlled so as to position a load device in accordance with the changes of a variable condition.

In such systems, it is frequently necessary to control a motor by means of a rather delicate and low-powered condition responsive device, as for example, a galvanometer or a compass needle. A common expedient in such systems is to periodically clamp or otherwise fix the sensitive condition responsive element and to provide mechanism which periodically performs a control function in accordance with the clamped position of the sensitive element. In such an arrangement, the sensitive element is not responsive to its controlling condition during the time when it is clamped, and the control function is not performed in accordance with the position of the condition responsive element during the time when the element is free to move. The sensitivity of the system is therefore adversely affected by the periodical nature of the control effect produced.

It is therefore an object of the present invention to provide a control system operated by a sensitive condition responsive element in which means are provided for improving the sensitivity of the control system.

Another object of the present invention is to provide an improved control system of the type wherein a sensitive condition responsive element is periodically clamped and the position of the clamped element is utilized to produce a control effect, wherein means is provided for prolonging the control effect beyond the duration of the time during which the sensitive element is clamped, so as to increase the sensitivity of the system.

A further object of the present invention is to provide an improved system of the type wherein a pair of control contacts are intermittently moved into engagement to produce a control effect, wherein the control effect produced by engagement of the contacts is substantially continuous regardless of the intermittent nature of the contact engagement.

A further object of the present invention is to provide improved means for intermittently stopping the motion of a sensitive control element.

Another object of the present invention is to provide, in a condition control system including a load device driven by a reversible motor, improved means for stopping motion of the load device instantaneously when the controller calls for a stop,

2 regardless of any tendency of the motor to overrun.

Other objects and advantages of the present invention will become apparent from a consideration of the appended specification, claims, and drawings, in which Figure 1 is a cross-sectional view of a control instrument operated by a compass and including preferred features of my invention, Figure 2 is a cross-sectional view of a modified form of control device embodying my invention.

Figures 3, 4, and 5 illustrate, somewhat diagrammatically, three different forms of control systems which may be used with either of the control devices shown in Figures 1 and 2, and Figure 6 shows a modified form of control system employing a somewhat different type of control device.

FIGURE 1

Referring now to Figure 1, there is shown a control instrument 28 including a casing 10 enclosing a compass needle 11, which is provided with damping vanes 12 of conventional form. The compass needle 11 is carried by a shaft 13 mounted in upper and lower bearings 14 and 15, respectively.

The upper bearing 14 is formed as part of a plug which is threaded through a hole in the center of an insulating plate 16 which covers the upper side of the casing 10. The bearing 15 is formed in a similar plug which threadedly engages the sides of a hole in the bottom of casing 10.

Shaft 13 is provided near its upper end with a flange 17 which carries a collar 18 of magnetic material. The collar 18 may be keyed or otherwise fixed to the shaft 13.

The collar 18 supports, in any suitable manner, a flexible finger 19. The finger 19 carries at one end a flexible contact member 20 which is shaped like a broad U, having the bottom of the U attached to the finger 19. There is also mounted on the finger 19, between the upwardly extending arms of the U-shaped contact 20, an armature 21, of magnetic material.

Imbedded in the lower base of the insulating cover plate 16 are a plurality of concentric contact segments 22, 23, and 24. The segment 23 is in the form of a circle about the shaft 13. (See Fig. 3.) The segments 22 and 24 are arcuate, and are concentric with the segment 23, but spaced radially therefrom. An electromagnet 25, comprising a coil 26, surrounded on three sides by a channel shaped yoke 27, is also imbedded in the lower surface of the insulating cover plate 16. The electromagnet 25 is also circular in form and is concentric with the contact segments 22, 23, and 24, about the shaft 13. The electromagnet 25 is spaced between the circular contact segment 23 and the outer contact segments 22 and 24, the arrangement being such that the electromagnet 25 is aligned with the armature 21 at all positions of pointer 19, while the contact segment 23 is aligned with the inner arm of the flexible contact 20 and either segment 22 or 24 may be aligned with other arm of contact 20, depending upon the angular position of pointer 19. The segments 22, 23, and 24 are adapted for connection to electrical control circuits by suitable conductors (not shown in Figure 1). It will be readily understood that upon energization of electromagnet 25, armature 21 is attracted into engagement therewith, which engagement is permitted by the flexibility of the finger 19. As armature 21 moves into engagement with electromagnet 25, the arms of the flexible contact 20 are moved into engagement with the stationary contacts 22 and 23.

The housing 10 is provided with a circumferential gear 31, cooperating with a gear 32 which may be driven by any suitable motor (not shown). The housing 10 may be mounted on a pivotal support (not shown), so that upon rotation of gears 32 and 31, the housing 10 is rotated.

It should be noted that the shaft 13 is elongated in order that the compass needle 11 at its lower end may be separated substantially from the electromagnet 25 at its upper end to prevent undue disturbance of the compass needle by the field of the electromagnet 25. Also, a magnetic shield 30 is placed across the housing 10 just under the finger 19. The purpose of this shield 30 is to prevent any stray magnetic flux from the electromagnet 25 from reaching the compass needle 11.

While I have indicated, for purposes of example and description, that finger 19 is rotated by a compass, it should be readily apparent that a similar structure could be made responsive to any desired controlling condition, such as temperature, pressure, gravity, the position of a movable member, etc.

FIGURE 2

In Figure 2 is shown a compass operated controller mounted in a housing 35 consisting of a lower cover portion 36, a base 37, and an upper cover portion 38. The lower cover portion 36 is threadedly attached to the base 37, and is provided with laterally extending ears 39 for mounting on any suitable support.

A compass needle 40 is carried by a shaft 41 which is supported on a thrust bearing 42 and extends upwardly through guide bearings 43 and 44, which are supported in spaced relation by the base 37.

The base 37 is provided with an upwardly extending central cylindrical portion 45. Supported on the upper surface of the cylindrical portion 45 is an electromagnet 46 of generally circular form, comprising a coil 47 in a channel shaped yoke 48.

The shaft 41 carries, above the upper surface of the cylindrical portion 45, a finger 50. The finger 50 carries an armature 51 aligned with the electromagnet 46.

A collar 52, of insulating material, surrounds the cylindrical portion 45 and carries on its upper surface a plurality of contact segments 53 which correspond generally to the segments 22 and 24 of Figure 1. For the sake of simplicity, only a single segment 53 is shown in the drawing, although it should be readily understood that any desired number of segments might be used. The finger 50 is sufficiently long that its extremity overlies the contact segments 53. The construction is such that when electromagnet 46 is energized, the armature 51 is drawn down into engagement with it, the flexibility of finger 50 permitting such engagement. At the same time the extremity of finger 50 is drawn into contact with one of the segments 53. The lateral surface of the collar 52 carries a plurality of slip rings 54, each of which is connected, by means not shown, to one of the segments 53. The surface of the collar 52 is also provided with a laterally projecting worm wheel 55, cooperating with a worm gear 56 which may be driven by a motor of any suitable construction (not shown).

A bracket 60 is mounted on the base 37 and supports an insulating block 61 which carries a plurality of brushes 62, each of which cooperates with one of the slip rings 54. Each brush 62 is connected by a conductor 63 to a terminal post 64 in a terminal panel 65 which is formed as an insert in the cover 38. Electrical conductors 66 are provided to connect the coil 47 of the electromagnet 46 to other terminals 67 on the terminal panel 65. Since the finger 50 is electrically connected to ground through the shaft 41 and the casing 35, it should be readily understood that upon engagement of finger 50 with any of the contact segments 53, an electrical circuit is completed between one of the terminals 64 and a conductor 63, brush 62, a slip ring 54, a contact segment 53, finger 50, and ground. Examples of suitable circuits which may be so controlled will be described in more detail hereinafter.

FIGURE 3

Referring now to Figure 3, there is shown an electrical control system in which a reversible motor 70 drives a suitable recording, indicating, or controlling mechanism 71 in response to a control instrument 28 similar to that shown in Figure 1.

In addition to the semi-circular contact segments 22 and 24 which appear in Figure 1, there is shown in Figure 3 an additional contact segment 29, which is intermediate the ends of segments 22 and 24.

The condition responsive instrument 28 electrically controls the energization of three relays 72, 73, and 74. The relay 72 comprises a winding 75, which is adapted to actuate a switch arm 76 cooperating with an in contact 77, a switch arm 78 cooperating with an out contact 79, and a switch arm 80 cooperating with an in contact 81. The relay 73 comprises an electrical winding 85, which controls the movements of a switch arm 86 cooperating with an out contact 87. The relay 74 comprises a winding 88, which controls the movement of a switch arm 89, cooperating with an out contact 90, a switch arm 91, cooperating with an in contact 92, and a switch arm 93 cooperating with an in contact 94.

The relays 72, 73, and 74 control the energization of motor 70, which comprises an armature 96 and a pair of field windings 97 and 98, which, when selectively energized, control the rotation of motor 70 in opposite directions. The armature 96 is connected through an electrically operated clutch 99 and a gear train indicated schematically at 100 to mechanism 71 and gear 32, which engages gear 31 for bodily rotating the control instrument 28.

An interrupter 101, comprising a coil 102, which controls the movements of a switch arm 103, cooperating with an out contact 104, is provided to control the energization of electromagnet 25.

*Operation of Figure 3*

Power for the control system shown in Figure 3 is obtained from suitable supply lines 110 and 111. Although a legend has been applied to the drawing, indicating that line 110 is positive and that line 111 is negative, this is merely for convenience. It will be readily understood by persons skilled in the art that either an alternating or a direct current supply could be used.

Coil 26 of electromagnet 25 is periodically energized through a circuit which may be traced from positive supply line 110 through a conductor 112, winding 26, the conductor 113, winding 102 of interrupter 101, switch arm 103, contact 104, and a conductor 114 to negative supply line 111. When this circuit is completed by engagement of switch arm 103 with contact 104, coil 26 is energized, thereby attracting the armature 21 and causing flexible contact member 20 to bridge the gap between circular contact segments 23 and one of the outer row of contact segments 22, 24, or 29. At the same time, winding 102 is energized to attract switch arm 103 and move it out of engagement with contact 104. When contact 103 is moved away from contact 104, the energizing circuit for electromagnet winding 26 is broken, thereby releasing armature 21 and causing flexible switch contact 20 to separate from the contact segments, thereby leaving finger 19 and shaft 13 free to rotate in accordance with the direction of the magnetic field or other variable condition to which they are responsive. It will be readily understood that the characteristics of interrupter 101 may be varied by means well known in the art so that the spacing of the intermittent energizations of coil 26, and the duration of such energizations, may be predetermined as desired.

When the finger 19 is in the position shown in the drawing, and the electromagnet 25 is energized to cause engagement of contact member 20 with segments 23 and 29, an energizing circuit is completed for winding 85 of relay 73. This circuit may be traced from positive supply line 110 through conductor 115, contact segment 23, contact member 20, contact segment 29, relay winding 85, and a conductor 116 to negative supply line 111. Energization of winding 85 causes switch arm 86 to move out of engagement with contact 87. When the parts are in the positions shown in the drawing, no further control effect is produced. Under certain other conditions to be described, however, the separation of switch arm 86 from contact 87 is utilized to open holding circuits for the windings 75 and 88 of relays 72 and 74.

When the finger 19 is in the position shown in the drawing, the condition to which the finger 19 responds has the value which the system is to maintain. It is for this reason that no control effect is produced on the motor 70 when the finger 19 is in this position.

Let it now be assumed that the controlling condition changes so that the shaft 13 is rotated in a clockwise direction as viewed in Figure 3, and that this change continues until the contact member 20 moves above the contact segment 22. Then when the armature 21 is next attracted by the energization of the electromagnet 25, contact member 20 bridges the gap between segments 23 and 22, completing a circuit for the energization of winding 75 of relay 72. This circuit may be traced from positive supply line 110 through conductor 115, contact segment 23, contact member 20, contact segment 22, a conductor 117, winding 75, and conductor 116 to negative supply line 111. This circuit is completed only for a time corresponding to the time of energization of electromagnet 25. However, the energization of winding 75 causes switch arm 76 to move into engagement with contact 77, thereby completing a holding circuit for winding 75. This holding circuit may be traced from positive supply line 110 through a conductor 118, contact 87, switch arm 86, conductors 119 and 120, contact 90, switch arm 89, conductor 121, switch arm 76, contact 77, a conductor 122, winding 75, and conductor 116 to negative supply line 111. This energization of winding 75 through the holding circuit is maintained until either switch arm 86 moves out of engagement with contact 87, upon energization of winding 85 of relay 73, as previously described, or until switch arm 89 moves out of engagement with contact 90 upon energization of winding 88 of relay 74.

Energization of winding 75 of relay 72 also causes switch arm 78 to move out of engagement with contact 79, thereby opening a holding circuit for winding 88 of relay 74, to be later described in detail.

Energization of winding 75 of relay 72 also causes switch arm 80 to move into engagement with contact 81, thereby completing an energizing circuit for motor 70 which may be traced from positive supply line 110 through a conductor 123, contact 81, switch arm 80, a conductor 124, field winding 98 and armature 96 of motor 70, a conductor 125, electrically operated clutch 99, and a conductor 126 to negative supply line 111. Clutch 99 is so constructed that when energized, it connects motor 70 with the gear train 100 and thereby with the gear 32 and the mechanism 71. Since the clutch 99 and the motor armature 96 are connected in series, the clutch is always energized whenever the motor is energized. When the motor is deenergized, the clutch is immediately deenergized, disconnecting the motor from its load and preventing the natural tendency of the motor to overrun from causing a corresponding overrunning of the mechanism 71 or the gear 32.

Energization of field winding 98 and armature 96 causes rotation of motor 70 in a direction such as to drive the gear 32 counter-clockwise, thereby driving the gear 31 clockwise, and moving the control instrument 28 so as to carry the contact segment 22 out from under the contact member 20 and bring the segment 29 under the contact member 20 again. When the motion of gear 31 has continued sufficiently to bring the segment 29 under the contact member 20, then on the next energization of electromagnet 25, the relay winding 85 will be energized as previously described, resulting in an interruption of the holding circuit through relay winding 75, and a consequent deenergization of motor 70 and clutch 99, thereby stopping motion of the gear 31.

It will be readily understood by those skilled in the art, that in certain types of control systems, the follow-up gears 31 and 32 may be omitted, as the operation of the control device 71 will be effective to change the controlling condition so as to bring the pointer 19 back to the normal position as shown in the drawing. Such an arrangement could be used, for example, where a magnetic compass is used to control the operation of the rudder in an aircraft so as to maintain the craft on a predetermined compass course. Then, in the event of a deviation of the craft from its course, the controller 71 would be operated to turn the rudder until the position of the finger 19 indicated that the craft had been restored to its predetermined course.

Let it now be assumed that the controlling condition changes so as to move the shaft 13 counter-clockwise, thereby moving the finger 19 also counter-clockwise from the position shown in the drawing until the contact member 20 moves above the contact segment 24. Then upon the next energization of electromagnet 25, an energizing circuit is completed for a winding 88 of relay 74. This energizing circuit may be traced from positive supply line 110 through conductor 115, contact segment 23, contact member 20, contact segment 24, a conductor 127, winding 88, and conductor 116 to negative supply line 111.

Energization of winding 88 causes switch arm 89 to move out of engagement with contact 90, thereby opening the holding circuit for relay circuit 75, if it has not been previously opened by energization of winding 85 of relay 53. Energization of winding 88 of relay 74 also causes switch arm 91 to move into engagement with contact 92, thereby establishing a holding circuit for winding 88 which may be traced from positive supply line 110 through conductor 118, contact 87, switch arm 86, conductors 119 and 128, switch arm 78, contact 79, a conductor 129, contact 92, switch arm 91, a conductor 130, winding 88, and conductor 116 to negative supply line 111. This holding circuit remains energized until opened by separation of switch arm 78 from contact 79 upon energization of winding 75 of relay 72, or upon separation of switch arm 86 from contact 87, upon energization of winding 85 of relay 73.

Energization of winding 88 of relay 74 also causes switch arm 93 to move into engagement with contact 94, thereby completing an energizing circuit for motor 70, which may be traced from positive supply line 110 through conductor 123, contact 94, switch arm 93, a conductor 131, winding 97, armature 96, conductor 125, clutch 99, and conductor 126 to negative supply line 111. Energization of field winding 97 and armature 96 of motor 70 causes rotation of motor 70 in a direction so as to drive the gear 32 in a clockwise direction, thereby moving gear 31 counter-clockwise and causing the control instrument 28 to follow the motion of the finger 19. When this motion of gear 31 has continued sufficiently, contact member 20 is again brought into alignment with segment 29 and upon the next energization of electromagnet 25, the relay 73 is energized through the circuit previously traced whereby moving switch arm 86 out of engagement with contact 87 and opening the holding circuit for winding 88 of relay 74, previously traced. Relay 74 is then deenergized, and motor 70 is stopped.

Summarizing, it should now be apparent that when the position of finger 19 is such that contact member 20 engages either contact segment 22 or 24, motor 70 is energized for rotation in one direction or the other, and the rotation of motor 70 is maintained, regardless of the intermittent nature of the contact between segments 22 and 24 and contact member 20, until the contact member 20 again engages the neutral contact segment 29. If by chance it should happen that while the holding circuit of either relay 72 or 74 was energized, the contact member 20, carried by finger 19, should move clear across the neutral contact segment 29 during one of the periods between successive energizations of electromagnet 25, then the next engagement of contact member 20 with segment 22 or 24 would cause deenergization of the previously established holding circuit for the relay 72 or 74, and the establishment of a new holding circuit for the relay corresponding to the contact segment 22 or 24 which is at the moment engaged by the contact member 20.

FIGURE 4

There is shown in Figure 4 a modification of the control system of Figure 3. In the control system of Figure 4 the condition responsive instrument 28 and the motor 70 correspond to the same elements in Figure 3, and have been assigned the same reference numerals. The relay system controlled by the instrument 28 is somewhat different than that of Figure 3. There are shown in Figure 4 three relays 140, 141, and 142, associated with the contact segments 22, 29, and 24 respectively. The relay 140 comprises a winding 143 controlling a switch arm 144 which cooperates with an out contact 145 and a switch arm 146, which cooperates with an in contact 147. The relay 141 comprises a winding 150 which controls the movements of a switch arm 151 relative to an in contact 152 and an out contact 153. The relay 142 comprises a winding 154 which controls the operation of a switch arm 155 cooperating with an out contact 156 and a switch arm 157 cooperating with an in contact 158.

The relays 140 and 142 are of the fast make, slow release type. That is to say, when energized, the relays rapidly move their associated switch arms to their energized position, but upon deenergization, the switch arms move back to their normal deenergized position slowly or with a time delay. This method of operation may be accomplished by any desired structure, several of which are well known in the art. For example, the relay may be provided with a one-way dashpot arrangement, which slows the movement of the armature towards its deenergized position, but is not effective to slow the movement of the armature of the relay in the direction of its energized position.

*Operation of Figure 4*

When the finger 19 is in the position shown in the drawing, the gap between segment 23 and segment 29 is bridged upon energization of electromagnet 25. When this occurs, an energizing circuit is completed for winding 150 of relay 141. This circuit may be traced from positive supply line 110 through conductor 115, contact segment 23, contact member 20, contact segment 29, winding 150, and a conductor 160 to negative supply line 111. Energization of winding 150 causes switch arm 151 to move into engagement with contact 152, thereby completing a holding circuit for winding 150, which may be traced from positive supply line 110 through a conductor 161, a conductor 162, switch arm 151, contact 152, a conductor 163, switch arm 155, contact 156, conductor 164, switch arm 144, contact 145, a conductor 165, winding 150, and the conductor 160 to the negative supply line 111. The winding 150 remains energized through this holding circuit regardless of the intermittent contact between contact member 20 and contact segment 29, until the holding circuit is broken by movement of switch arm 144 out of engagement with contact 145, or by movement of switch arm 155 out of engagement with contact 156 as the result of energization of either relay winding 143 or 154, respectively.

When relay winding 150 is deenergized, the switch arm 151 moves into engagement with out contact 153, thereby completing an energizing circuit for clutch 99 between motor 70 and its load. This energizing circuit for clutch 99 may be traced from positive supply line 110 through conductor 161, conductor 162, switch arm 151, contact 153, a conductor 166, clutch 99, and a conductor 167 to negative supply line 111.

When the finger 19 is in a position such that energization of electromagnet 25 causes the contact member 20 to bridge the gap between segments 23 and 22, the bridging of that gap completes an energizing circuit for winding 143 of relay 140. This circuit may be traced from positive supply line 110 through conductor 115, segment 23, contact member 20, contact segment 22, winding 143, and conductor 160 to negative supply line 111.

Energization of winding 143 causes switch arm 144 to move out of engagement with contact 145, thereby breaking the holding circuit for winding 150 of relay 141, previously traced. Energization of relay winding 143 also causes switch arm 146 to move into engagement with contact 147, thereby completing an energizing circuit for motor 70. This energizing circuit may be traced from positive supply line 110 through conductor 161, contact 147, switch arm 146, a conductor 168, winding 98, armature 96, and conductor 167 to negative supply line 111. Energization of motor field winding 98 causes rotation of motor 70 in a direction to drive gear 32 in a counter-clockwise direction, thereby driving gear 31 in a clockwise direction and moving contact segment 29 to follow the movement of finger 19. Since winding 150 of relay 141 is at this time deenergized, switch arm 151 engages contact 153, thereby completing the energizing circuit for clutch 99. Energization of clutch 99 completes the mechanical connection between the motor 70 and the gear 32.

Although the energization of relay 140 by engagement of contact member 20 with contact segment 22 is intermittent, the energization of motor 70 is prolonged beyond the period of engagement of contact member 20 and contact segment 22 because of the fast make, slow release characteristic of relay 140. Furthermore, since the clutch 99 remains energized continuously until the contact member 20 again engages contact 29, the natural overrun of the motor after its deenergization is utilized to drive the gears 32 and 31 further in the proper direction to follow the motion of finger 19. By proper design of relays 140 and 142, and coordination of their characteristics with those of interrupter 101, the driving of gear 32 and mechanism 71 by the motor may be made substantially continuous whenever the contact member 20 is maintained above either segment 22 or 24.

When finger 19 is in such a position that contact member 20 engages contact segment 24 upon energization of electromagnet 25, an energizing circuit is completed for winding 154 of relay 142. This circuit may be traced from positive supply line 110 through conductor 115, contact segment 23, contact member 20, contact segment 24, winding 154, and conductor 160 to negative supply line 111. Energization of winding 154 causes switch arm 155 to move out of engagement with contact 156, thereby opening the holding circuit for winding 150 of relay 141, previously traced.

Energization of winding 154 also causes switch arm 157 to move into engagement with contact 158, thereby completing an energizing circuit for motor 70, which may be traced from positive supply line 110 through conductor 161, contact 158, switch arm 157, a conductor 169, field winding 97 and armature 96 of motor 70, and conductor 167 to negative supply line 111.

Deenergization of winding 150 of relay 141 allows switch arm 151 to engage contact 153, thereby energizing the clutch 99 through the circuit previously traced and connecting motor 70 with mechanism 71 and gear 72. Energization of field winding 97 and armature 96 causes motor 70 to drive gear 32 in a clockwise direction, rotating gear 31 counter-clockwise and causing contact segment 29 to follow the motion of finger 19.

From the foregoing, it should be apparent that in the system of Figure 4, the overrun of the motor is advantageously utilized to drive the follow-up mechanism as long as the controlling condition is different from its desired value, but as soon as the controlling condition reaches its desired value, the motor is declutched from its load so that the overrun of the motor will not cause the follow-up system to overshoot.

FIGURE 5

In Figure 5 is shown another modification of the control system of Figure 3. In Figure 5, the follow-up connection between the motor 70 and the condition responsive control instrument is omitted. Also, the clutch between the motor 70 and the mechanism 71, which it drives, is omitted. All parts which are equivalent to the corresponding parts in Figure 3 have been given the same reference numerals in both Figures 3 and 5.

The sensitive control instrument 174 of Figure 5 differs from the instrument 29 of Figure 3 in that two intermediate contact segments 175 and 176 are spaced between the ends of segments 22 and 24, the latter pair of segments being shortened to accommodate the two segments which replace the single segment 29 of Figure 3.

The condition responsive instrument 174 controls the motor 70 through four relays, 177, 178, 179, and 180, which are associated with contact segments 22, 175, 176, and 24 respectively. The relay 177 comprises a winding 181 which controls the movement of a switch arm 182 relative to a cooperating in contact 183, and the movements of a switch arm 184 relative to a cooperating in contact 185 and a cooperating out contact 186. The relay 178 comprises a winding 187 which controls the movements of a switch arm 188 relative to a cooperating in contact 189, and a cooperating out contact 190. Relay 179 comprises a winding 191 which controls the movements of a switch arm 192 relative to a cooperating in contact 193, and the movements of a switch arm 194 relative to a cooperating out contact 195. The relay 180 comprises a winding 196 which controls the movement of a switch arm 197 relative to a cooperating in contact 198, and the movements of a switch arm 199 relative to a cooperating in contact 200, and a cooperating out contact 201.

Operation of Figure 5

When the finger 19 is in the position shown in the drawing, the contact member 20 is not engaging any of the segments 22, 24, 175, or 176, nor does it engage any of those segments when the electromagnet 25 is energized. Under these conditions, let it be assumed that the controlling condition changes so as to cause shaft 13 to move finger 19 in a clockwise direction until it moves above the contact segment 175. Then on the next energization of electromagnet 25, contact member 20 bridges the gap between segments 23 and 175, thereby completing an energizing circuit for winding 187 of relay 178. This circuit may be traced from positive supply line 110 through conductor 115, segment 23, contact member 20, segment 175, winding 187, and a conductor 205 to the negative supply line 111. Energization of winding 187 of relay 178 causes movement of switch arm 188 into engagement with contact 189, thereby completing an energizing circuit for winding 98 of motor 70. This energizing circuit may be traced from positive supply line 110 through a conductor 206, switch arm 188, contact 189, a conductor 207, field winding 98, armature 96, and a conductor 208 to negative supply line 111. Energization of field winding 98 and armature 96 of motor 70 causes the motor to run in the direction indicated by the sense in which the controlling condition varies from its predetermined value. It should be noted that there is no holding circuit associated with relay 178, so that as long as contact member 20 engages contact segment 175 intermittently, the motor 70 is energized through the winding 98 intermittently.

Let it now be assumed that the controlling condition continues to vary in the same sense, thereby causing further clockwise movement of finger 19 so that the contact member 20 is gradually moved to a point where it engages contact segment 22 when the armature 21 is attracted upon energization of electromagnet 25. As soon as contact member 20 engages contact segment 22, an energizing circuit is completed for winding 181 of relay 177. This energizing circuit may be traced from positive supply line 110 through conductor 115, segment 23, contact member 20, contact segment 22, winding 181, and conductor 205 to negative supply line 111.

Energization of winding 181 causes switch arm 182 to move into engagement with contact 183, thereby completing an energizing circuit for winding 98 and armature 96 of motor 70. This circuit may be traced from the positive supply line 110 through conductor 206, switch arm 182, contact 183, conductor 207, field winding 98, armature 96 and conductor 208 to negative supply line 111.

Energization of winding 181 of relay 177 also causes movement of switch arm 184 into engagement with contact 185. This completes a holding circuit for winding 181 which may be traced from positive supply line 110 through conductor 206, switch arm 188, contact 190, a conductor 209, switch arm 194, contact 195, a conductor 210, contact 201, switch arm 199, a conductor 211, switch arm 184, contact 185, a conductor 212, winding 181, and conductor 205 to negative supply line 111. Winding 181 therefore remains energized until its holding circuit is broken either at contact 190, 195, or 201, which might occur upon energization of relays 178, 179, or 180, respectively. Therefore when the contact member 20 engages contact segment 22, the motor is continuously energized regardless of the intermittent nature of the contact between contact member 20 and contact segment 22.

Let it now be assumed that the controlling condition changes in such a sense that finger 19 moves in a counterclockwise direction so that upon energization of electromagnet 25, contact member 20 moves into engagement with contact segment 176. This completes an energizing circuit for winding 191 of relay 179. This energizing circuit can be traced from positive supply line 110 through conductor 115, contact segment 23, contact member 20, contact segment 176, winding 191 and conductor 205 to negative supply line 111.

Energization of winding 191 of relay 179 causes the switch arm 192 to move into engagement with contact 193, thereby completing an energizing circuit for field winding 97 and armature 96 of motor 70. This motor energizing circuit may be traced from the positive supply line 110 through conductor 206, switch arm 192, contact 193, a conductor 213, field winding 97, armature 96, and conductor 208 to negative supply line 111. Since there is no holding circuit associated with the relay 179, motor 70 is intermittently energized as long as the finger 19 remains in a position where contact member 20 is aligned with contact 156, this intermittent energization being produced by the action of electromagnet 25.

Now consider that the controlling condition causes finger 19 to move further in a counterclockwise direction until the contact member 20 reaches a position aligned with the contact segment 24. Then upon the next energization of electromagnet 25, contact member 20 bridges the gap between contact segments 23 and 24, thereby completing an energizing circuit for winding 196 of relay 180. This energizing circuit can be traced from the positive supply line 110 through conductor 115, contact segment 23, contact member 20, contact segment 24, winding 196, and conductor 205 to negative supply line 111.

Energization of winding 196 of relay 180 causes switch arm 197 to move into engagement with contact 198, thereby completing an energizing circuit for field winding 97 and armature 96 of motor 70. This circuit may be traced from the positive supply line 110 through conductor 206, switch arm 197, contact 198, conductor 213, field winding 97, motor armature 96, and conductor 208 to negative supply line 111.

Energization of winding 196 of relay 180 also causes switch arm 199 to move into engagement with contact 200, thereby establishing a holding circuit for winding 196. This holding circuit may be traced from positive supply line 110, through conductor 206, contact arm 188, contact 190, conductor 209, switch arm 194, contact 195, conductor 210, contact 186, switch arm 184, conductor 211, switch arm 199, contact 200, a conductor 214, winding 196, and conductor 205 to negative supply line 111. This holding circuit remains energized, keeping the motor 70 continuously energized until the holding circuit is broken at either contact 186, contact 190, or contact 195, which breaking of the holding circuit occurs upon energization of any of relays 177, 178, or 179, respectively.

From the foregoing, it should be apparent that in the system of Figure 5, the motor 70 is intermittently energized when the controlling condition departs a small amount from the predetermined value which the system is to maintain, and is continuously energized when the controlling condition departs a larger amount from the desired value.

FIGURE 6

The control system shown in Figure 6 illustrates the application of some of the principles of my invention to a system of a type somewhat different than that previously described. In Figure 6, a sensitive condition responsive element (not shown) moves a contact finger 225 about a pivot 226. The extremity of the finger 225 overlies and is normally spaced from a resistance element 227. The finger 225 carries, at an intermediate point, an armature 228, which is aligned with an electromagnet 229, of generally arcuate form. The arrangement may correspond generally to the condition responsive switching arrangement shown in Figure 1, except that the contact segments 22 and 24 have been replaced by the resistance element 227. The finger 225 corresponds generally to finger 19 and the electromagnet 229 corresponds to the electromagnet 25 of Figure 1.

The finger 225 and the resistance 227 form a control potentiometer 231 which is a part of a normally balanced electrical control network generally indicated 230. The network 230 also includes a rebalancing potentiometer 232, which comprises a resistance element 233 and a slider contact 234, which moves along the resistance element 233 upon rotation of the shaft 235 on which the slider 234 is mounted.

The network 230 is supplied with electrical energy from any suitable source which is shown as a battery 236 having one of its terminals connected to the finger 225 by a conductor 237, and its other terminal connected to the slider 234 by a conductor 238.

The network 230 includes a pair of output terminals 240 and 241, which are at the same potential when the network is balanced. The network is balanced whenever the finger 225 and the slider 224 are at corresponding positions along their respective resistances 227 and 233. Protective resistances 242 are provided in each of the branches of the network in order to prevent short-circuiting of the battery 236 when both finger 225 and slider 234 are at the same end of their corresponding resistance elements.

The balanced or unbalanced condition of the network 230 controls the conductive condition of a pair of gaseous discharge tubes 243 and 244, which may be for example, of the type 2050. The gaseous discharge device 243 comprises an anode 245, a control electrode 246, and a cathode 247. The gaseous discharge device 244 includes an anode 248, a control electrode 249, and a cathode 250. The control electrode 246 of device 243 is connected to output terminal 240 of network 230 by a conductor 251. The control electrode 249 of discharge device 244 is connected through output terminal 241 of network 230 by a conductor 252.

The discharge devices 243 and 244 control the energization of a motor indicated generally as 255, and including an armature 256 and a pair of field windings 257 and 258 which control the energization of the motor in opposite directions. The motor 255 is connected through an electrically operated clutch 259 to the shaft 235 which operates slider 234 of the rebalancing potentiometer 232 and a recording, indicating, or controlling mechanism schematically indicated at 260.

The cathodes 247 and 250 may be heated by any suitable source of electrical energy, as for example, the batteries 261 and 262 shown on the drawing. Cathodes 247 and 250 are connected through a conductor 263 to the negative supply line 264 which is grounded at 265. The control electrodes 246 and 249 are supplied with a biasing potential by means of a battery 266, which is connected between conductor 263 and the output terminals 240 and 241 of network 230. A pair of resistances 267 and 268 are connected between the negative terminal of battery 266 and each of the terminals 240 and 241.

Power is supplied to the electromagnet 229 and to the motor 255 from a pair of direct current supply lines 270 and 264. The supply of energy to these devices is interrupted at suitable intervals, to be more completely described later, by means of a commutator device shown generally as 271, which is continuously driven by a motor 272 having a field winding 273 and an armature 274 connected in series between the supply lines 270 and 264 by means of conductors 275 and 276.

The commutator device 271 comprises an arm 275 rotating with a shaft 276 and carrying a set of three brushes 277, 278, and 279. The brush 277 cooperates with a contact segment 280 concentric with the shaft 276. The brush 278 cooperates with a pair of short arcuate contact segments 281 and 282, which are also concentric with the shaft 276. The brush 279 cooperates with a pair of long arcuate segments 283 and 284, which are also concentric with the shaft 276 and which have gaps between their ends substantially aligned with the short arcuate segments 281 and 282.

Operation of Figure 6

As the commutator arm 275 rotates, a positive potential is supplied to the anodes 245 and 248 of the discharge devices 243 and 244 whenever the brush 279 engages either of the contact segments 283 or 284. The circuit through which this potential is supplied may be traced from positive supply line 270 through a conductor 290, contact segment 280, brush 277, commutator arm 275, brush 279, segment 283 or 284, a conductor 291, clutch 259, a conductor 292, armature 256 of motor 255, and either field winding 257 or 258 to anode 245 or 248. If the discharge devices 243 and 244 remain nonconducting at this time, no current flows through the connection just traced and the motor remains stationary.

When the network 230 is balanced, the output terminals 240 and 241 are at the same potential, so that no current flows through the connection including the resistances 267 and 268. At that time the only potential supplied to the control electrodes 246 and 249, is that supplied by the biasing battery 266, which is of a polarity and magnitude such as to prevent the initiation of a discharge through the devices 243 or 244.

Since the finger 225 is normally spaced from the resistance 227, there is normally no current flowing through the network 230, and hence, no unbalance potential at the output terminals 240 and 241. The electromagnet 229 is periodically energized, however, and upon such periodical energization, the tip of finger 225 is moved into engagement with resistance 227, so that electrical energy is supplied to the network 230 from the battery 236. The energizing circuit for electromagnet 229 may be traced from positive supply line 270 through conductor 290, contact segment 280, brush 277, commutator arm 275, brush 278, either contact segment 281 or 282, a conductor 293, electromagnet 229, and a conductor 294 to ground at 295. Since the supply line 264 is grounded at 265, when this circuit is completed by engagement of brush 278 with segments 281 or 282, the electromagnet 229 is connected across the supply lines. The commutator arm 275 rotates in a clockwise direction, as indicated by the legend in the drawing.

It should be noted that the relative position of the contact segments 281 and 282 with respect to the positions of the segments 283 and 284 are such that the electromagnet 229 is energized just before the positive voltage is applied to the anode 245 and 248 of the discharge devices 243 and 244. This relative position is chosen so that the inherent lag of the electromagnet 229 insures that the tip of finger 225 engages the resistance 227 at the moment when the positive potential is first applied to the anodes 245 and 248. If desired, the segments 281 and 282 may be adjustably mounted so that they may be moved to their optimum position with respect to segments 283 and 284.

If the bridge circuit 230 is unbalanced, due to a change in the controlling conditions, at the time when finger 225 engages resistance 227, a potential difference is set up between the output terminals 240 and 241. For example, if the finger 225 is moved to the left from the position shown in the drawing, then the terminal 240 becomes more negative than terminal 241 since there is less resistance between it and the negative terminal of the battery 236. Therefore a voltage drop exists across both the resisters 267 and 268 in such a sense that their right hand terminals are positive with respect to their left hand terminals. The potential drop across resistance 267 is then in the same sense as that of the battery 266 as far as the connection between the cathode 247 and the control electrode 246 of the discharge device 243 is concerned. Therefore the control electrode 246 is made more negative than before and the discharge device 243 is prevented from becoming conductive. In the connection between cathode 250 and grid 249, however, the potential drop across resistance 268 is in a sense opposite to that of the drop across biasing battery 266. The potential of control electrode 249 is thereby made more positive. If the battery 266 has been so chosen as to just maintain the devices 243 and 244 cut off, the addition of this positive potential to the control electrode 249 will cause the initiation of a discharge through that device. The devices 243 and 244 are of the gaseous type wherein when a discharge has been initiated, it is maintained until the anode-cathode circuit is opened, regardless of the potential applied to the control electrode. Therefore, if a discharge is initiated in the device 244 at the same time that a positive potential is applied to the anode 248, the device 244 is rendered conductive and remains conductive until the anode-cathode circuit is opened by the movement of brush 279 past the end of the contact segment 283 or 284.

It will be readily understood that if the network 230 is unbalanced in the opposite sense, i. e., so that output terminal 241 is negative with respect to output terminal 240, then when the pointer 225 engages slider 227, the discharge device 243 becomes conductive, due to the positive potential applied to its control electrode 246.

When the discharge device 244 is conductive, the current flow through the armature 256 and field windings 258 of motor 255, and through the electrically operated clutch 259, causing the latter to connect the motor 255 to its load. Energization of armature 256 and field winding 258 causes the motor 255 to drive the shaft 235 counter-clockwise, thereby moving slider 234 to the left along resistance 233. This motion stops when the brush 279 reaches the end of segment 283 or 284, and the electromagnet 229 is again energized. If at this time, the motor has moved the slider 234 far enough to the left to balance the position of the finger 225 with respect to resistance 227, the network 230 is again balanced, and the motor remains stationary when the brush 279 again engages segment 283 or 284.

If, however, the position of the tip of finger 225 does not correspond to that of slider 234 when the electromagnet 229 is energized, either discharge device 243 or 244 breaks down, causing energization of motor 255 to drive the slider 234 in the proper direction to rebalance the network 230.

By intermittently energizing the network 230 in this way, I am able to use a much higher potential on the network 230 with no greater heating or resistance loss, than could be used if the network were continuously energized. By using a higher voltage, the potential drop per unit length of the resistances 227 and 233 is increased, thereby increasing the sensitivity of the system.

While I have shown and described certain preferred embodiments of my invention, other modifications thereof will readily occur to those skilled in the art, and I therefore wish my invention to be limited only by the appended claims.

I claim as my invention:

1. Electrical control apparatus, comprising in combination, relatively stationary and movable contact means, condition responsive means for moving said movable contact means through a path parallel to and spaced from said stationary contact means, time-controlled means for periodically causing engagement of said contact means, an electrical control device, means responsive to engagement of said contact means to initiate energization of said control device, and means effective to maintain energization of said control device after initiation thereof for a period longer than the time of engagement of said contacts while said condition responsive means is free to move said movable contact means.

2. Electrical control apparatus, comprising in combination, a movable contact, a plurality of contacts normally spaced from and stationary with respect to said movable contact, an electrical control device, means responsive to a condition indicative of the need for operation of said control device for moving said movable contact along a path parallel to and spaced from said stationary contact, time-controlled means for periodically causing engagement of said movable contact with said stationary contacts, means responsive to engagement of a first of said plurality of contacts by said movable contact to initiate energization of said control device for operation in a predetermined sense, means responsive to engagement of a second of said plurality of contacts by said movable contact to initiate energization of said control device for operation in an opposite sense, and means effective to maintain energization of said control device after initiation thereof for a period longer than the time of engagement of said contacts while said condition responsive means is free to move said movable contact means.

3. Electrical control apparatus, comprising in combination, movable contact means, stationary contact means normally spaced from said movable contact means, an electrical control device, means responsive to a condition indicative of the need for operation of said control device for moving said movable contact means along a path parallel to and spaced from said stationary contact means, said movable contact means normally having a predetermined neutral position on said path, time-controlled means for periodically causing engagement of said movable contact means with said stationary contact means, means responsive to engagement of said movable contact means with said stationary contact means at a point displaced from said neutral position to initiate energization of said control device for operation in a sense dependent upon the direction of such displacement, and means effective to maintain energization of said control device after initiation thereof for a period longer than the time of engagement of said contacts while said condition responsive means is free to move said movable contact means.

4. Electrical control apparatus, comprising in combination, a movable contact, a plurality of contacts normally spaced from and stationary with respect to said movable contact, an electrical control device, means responsive to a condition indicative of the need for operation of said control device for moving said movable contact along a path parallel to and spaced from said stationary contacts, time-controlled means for periodically causing engagement of said movable contact with said stationary contacts, first relay means for controlling energization of said control device for operation in a predetermined sense, second relay means for controlling energization of said control device for operation in an opposite sense, means including a first electrical circuit completed upon engagement of said movable contact with a first of said plurality of contacts for energizing said first relay means, means including a second electrical circuit completed upon engagement of said movable contact with a second of said plurality of contacts for energizing said second relay means, and holding circuit means for each of said relay means effective to maintain the energization thereof for a period longer than the time of engagement of said contacts.

5. Electrical control apparatus, comprising in combination, a movable contact, a plurality of contacts normally spaced from and stationary with respect to said movable contact, an electrical control device, means responsive to a condition indicative of the need for operation of said control device for moving said movable contact along a path parallel to and spaced from said stationary contacts, time-controlled means for periodically causing engagement of said movable contact with said stationary contacts, first relay means for controlling energization of said control device for operation in a predetermined sense, second relay means for controlling energization of said control device for operation in an opposite sense, means including a first electrical circuit completed upon engagement of said movable contact with a first of said plurality of contacts for energizing said first relay means, means including a second electrical circuit completed upon engagement of said movable contact with a second of said plurality of contacts for energizing said second relay means, holding circuits for said first and second relay means, third relay means operative upon energization thereof to interrupt both said holding circuits, and means including a third electrical circuit completed upon engagement of said movable contact with a third of said plurality of contacts intermediate said first and second contacts for energizing said third relay means.

6. Electrical control apparatus, comprising in combination, a movable contact, a plurality of contacts normally spaced from and stationary with respect to said movable contact, an electrical control device, means responsive to a condition indicative of the need for operation of said control device for moving said movable contact along a path parallel to and spaced from said stationary contacts, time-controlled means for periodically causing engagement of said movable contact with said stationary contacts, first relay means for controlling energization of said control device for operation in a predetermined sense, second relay means for controlling energization of said control device for operation in an opposite sense, means including a first electrical circuit completed upon engagement of said movable contact with a first of said plurality of contacts for energizing said first relay means, means including a second electrical circuit completed upon engagement of said movable contact with a second of said plurality of contacts for energizing said second relay means, holding circuits for said first and second relay means, switch means operated upon energization of either of said relay means to interrupt the holding circuit of the other relay means, third relay means operative upon energization thereof to interrupt both said holding circuits, and means including a third electrical circuit completed upon engagement of said movable contact with a third of said plurality of contacts intermediate said first and second contacts for energizing said third relay means.

7. Electrical control apparatus, comprising in combination, movable contact means, stationary contact means normally spaced from said movable contact means, an electrical control device, means responsive to a condition indicative of the need for operation of said control device for moving said movable contact means along a path parallel to and spaced from said stationary contact means, said movable contact means normally having a predetermined neutral position on said path, time-controlled means for periodically causing engagement of said movable contact means with said stationary contact means, a pair of electrical discharge devices, each including an input circuit and an output circuit, and having a characteristic such that upon initiation of a discharge therethrough, the discharge is maintained until said output circuit is effectively deenergized, means responsive to engagement of said movable contact means with said stationary contact means at a point displaced from said neutral position for initiating a discharge in one of said discharge devices selectively in accordance with the direction of such displacement, means connected in said output circuits for causing operation of said control device in a sense dependent upon the relative conductivity of said discharge devices, and means for periodically effectively deenergizing said output circuits.

8. Electrical control apparatus, comprising in combination, movable contact means, stationary contact means normally spaced from said movable contact means, an electrical control device, means responsive to a condition indicative of the need for operation of said control device for moving said movable contact means along a path parallel to and spaced from said stationary contact means, said movable contact means normally having a predetermined neutral position on said path, time-controlled means for periodically causing engagement of said movable contact means with said stationary contact means, a pair of electrical discharge devices each including an input circuit and an output circuit, and having a characteristic such that upon initiation of a discharge therethrough, the discharge is maintained until said output circuit is effectively deenergized, means responsive to engagement of said movable contact means with said stationary contact means at a point displaced from said neutral position for initiating a discharge in one of said discharge devices selectively in accordance with the direction of such displacement, means connected in said output circuits for causing operation of said control device in a sense dependent upon the relative conductivity of said discharge devices, and means associated with said time-controlled means for deenergizing and reenergizing said output circuits in timed relation with the periodical engagements of said contact means.

9. Electrical control apparatus, comprising in combination, a movable contact, a plurality of contacts normally spaced from and stationary with respect to said movable contact, an electrical control device, means responsive to a condition indicative of the need for operation of said control device for moving said movable contact along a path parallel to and spaced from said stationary contacts, time-controlled means for periodically causing engagement of said movable contact with said stationary contacts, means responsive to engagement of a first of said plurality of contacts by said movable contact to initiate energization of said control device for operation in a predetermined sense, means responsive to engagement of a second of said plurality of contacts by said movable contact to initiate energization of said control device for operation in an opposite sense, and means effective to maintain energization of said control device after initiation thereof for a period longer than the time of engagement of said contacts, said last named means comprising slow release relay means associated with each of said energization initiating means.

10. Electrical control apparatus, comprising in combination, a movable contact, a pair of contacts normally spaced from and stationary with respect to said movable contact, a reversible electrical motor, means responsive to a condition indicative of the need for operation of said motor for moving said movable contact along a path parallel to and spaced from said stationary contacts, time controlled means for periodically causing engagement of said movable contact with said stationary contacts, a pair of relays for selectively controlling the operation of said motor in opposite directions, energizing circuits for each of said relays, each said circuit comprising said movable contact and one of said stationary contacts, holding circuits for each of said relays, and switch means operated upon energization of either relay to interrupt the holding circuit of the other relay.

11. Electrical control apparatus, comprising in combination, a movable contact, a row of at least three contacts normally spaced from and stationary with respect to said movable contact, a reversible electrical motor, means responsive to a condition indicative of the need for operation of said motor for moving said movable contact along a path parallel to and spaced from said stationary contacts, time-controlled means for periodically causing engagement of said movable contact with said stationary contacts, a pair of relays for selectively controlling the operation of said motor in opposite directions, energizing circuits for each of said relays, each said circuit comprising said movable contact and the stationary contact at one of the ends of said row, holding circuits for each of said relays, switch means operated upon energization of either relay to interrupt the holding circuit of the other relay, a third relay, an energizing circuit for said third relay comprising said movable contact and a contact substantially at the center of said row, and switch means operated upon energization of said third relay to interrupt both said holding circuits.

12. Electrical control apparatus, comprising in combination, a movable contact, a row of four contacts normally spaced from and stationary with respect to said movable contact, a reversible electrical motor, means responsive to a condition indicative of the need for operation of said motor for moving said movable contact along a path parallel to and spaced from said stationary contacts, time-controlled means for periodically causing engagement of said movable contact with said stationary contacts, and means for selectively controlling the operation of said motor in opposite directions in accordance with the direction of displacement of said movable contact from the center of said row, said last-named means comprising means responsive to engagement of said movable contact with either of the stationary contacts at the ends of said row for causing continuous operation of said motor, and means responsive to engagement of said movable contact with either of the stationary contracts adjacent the center of said row for causing intermittent operation of said motor only during said periods of engagement.

13. Electrical control apparatus, comprising in combination, a movable contact, a row of four contacts normally spaced from and stationary with respect to said movable contact, a reversible electrical motor, means responsive to a condition indicative of the need for operation of said motor for moving said movable contact along a path parallel to and spaced from said stationary contacts, time-controlled means for periodically causing engagement of said movable contact with said stationary contacts, four relays, energizing circuits for each of said relays including one of said four contacts, holding circuits for each of the relays associated with the stationary contacts at the ends of said row, switch means operable upon energization of another of said relays for interrupting said holding circuits, and means for selectively controlling the operation of said motor in opposite directions in accordance with the direction of displacement of said movable contact from the center of said row.

14. Electrical control apparatus, comprising in combination, a stationary member, a member movable along a path substantially parallel to and spaced from said stationary member, condition responsive means for causing movement of said movable member, first contact means on said stationary member comprising a pair of parallel elongated contact arrangements laterally spaced and having their long dimension parallel to said path, second contact means carried by said movable member comprising a pair of contacts mounted on a conducting strip adapted to bridge the space between said pair of elongated contact arrangements, elongated electromagnet means extending parallel to said pair of elongated contact arrangements, armature means carried by said movable member in alignment with said electromagnet means, and means for periodically energizing said electromagnet means.

15. Electrical control apparatus, comprising in combination, an electrical motor, control means for said motor including a pair of contacts, time controlled means for periodically causing engagement of said contacts, further means for relatively positioning said contacts, and means effective to maintain the energization of said motor for a period longer than the time of engagement of said contacts to enable said further means to position said contacts while said motor is still energized.

16. Electrical control apparatus, comprising in combination, an electrical motor, a load device to be driven by said motor, clutch means for connecting said motor and said load device, a movable contact, a plurality of contacts normally spaced from and stationary with respect to said movable contact, means responsive to a condition indicative of the need for operation of said control device for moving said movable contact along a path parallel to and spaced from said stationary contacts, time-controlled means for periodically causing engagement of said movable contact with said stationary contacts, said movable contact normally having a neutral position on said path opposite one of said plurality of contacts, means responsive to engagement of said movable contact with said one contact to cause operation of said clutch means to disconnect said motor and said load device, and means responsive to engagement of said movable contact with another of said plurality of contacts to cause energization of said motor and operation of said clutch means to connect said motor and said load device.

SIEGFRIED G. ISSERSTEDT.

REFERENCES CITED

The following references are of record in the file of this patent:

UNITED STATES PATENTS

| Number | Name | Date |
| --- | --- | --- |
| 1,730,951 | Sperry | Oct. 8, 1929 |
| 1,774,673 | Schleicher et al. | Sept. 20, 1930 |
| 1,939,775 | Holmes | Dec. 19, 1933 |
| 1,997,412 | Fischel | Apr. 9, 1935 |
| 2,085,442 | Newell | June 29, 1937 |